United States Patent [19]

Anderberg

[11] 4,184,655
[45] Jan. 22, 1980

[54] PARKING GUIDANCE SYSTEM FOR AIRCRAFT

[76] Inventor: Nils-Eric Anderberg, Lauritz Weibulls v. 27, 223 65 Lund, Sweden

[21] Appl. No.: 834,613

[22] Filed: Sep. 19, 1977

[30] Foreign Application Priority Data

Sep. 29, 1976 [SE] Sweden ............................ 7610777

[51] Int. Cl.² ........................................... B64F 1/36
[52] U.S. Cl. ............................. 244/114 R; 180/313;
246/122 R; 340/23; 340/26; 340/51; 116/29
[58] Field of Search ............... 244/114 R; 116/50, 29,
116/124 R; 340/23, 31 R, 26, 37, 51, 25, 24, 38
L, 38 R, 38 P; 246/77, 122 R, 167 R, 182 B, 187
R; 200/86 A; 73/178 T; 180/1 AP

[56] References Cited

U.S. PATENT DOCUMENTS

| | | | |
|---|---|---|---|
| 2,535,162 | 12/1950 | Rodgers | 246/122 R |
| 2,896,531 | 7/1959 | Dodge et al. | 340/51 |
| 3,020,005 | 2/1962 | Stockwell | 340/31 R |
| 3,425,515 | 2/1969 | McDonald et al. | 246/182 B |
| 3,509,527 | 4/1970 | Oakes et al. | 340/51 |
| 3,690,599 | 9/1972 | Hager | 244/114 R |
| 3,729,262 | 4/1973 | Svead | 244/114 R |
| 3,840,877 | 10/1974 | Crane | 340/26 |
| 3,865,071 | 2/1975 | Manor | 73/178 T |
| 3,911,390 | 10/1975 | Myers | 340/38 R |
| 3,968,339 | 7/1976 | Heaton | 200/86 A |

Primary Examiner—Galen L. Barefoot
Attorney, Agent, or Firm—Beveridge, DeGrandi, Kline & Lunsford

[57] ABSTRACT

A guidance system for use by a pilot in parking an aircraft on a parking place at an air terminal building and in stopping the aircraft at an exactly predetermined stopping point in the parking place. The system includes a transmitter unit having a plurality of transmitter elements disposed on the ground in the region of the parking place and successively following upon each other in the direction of travel of the aircraft. When the nose wheel of the aircraft successively passes over the transmitter elements these elements activate an information unit preferably mounted on the air terminal building within the pilot's field of vision. The information unit includes indicator elements which continuously inform the pilot of the length of the distance up to the stopping point and when this stopping point is reached.

19 Claims, 3 Drawing Figures

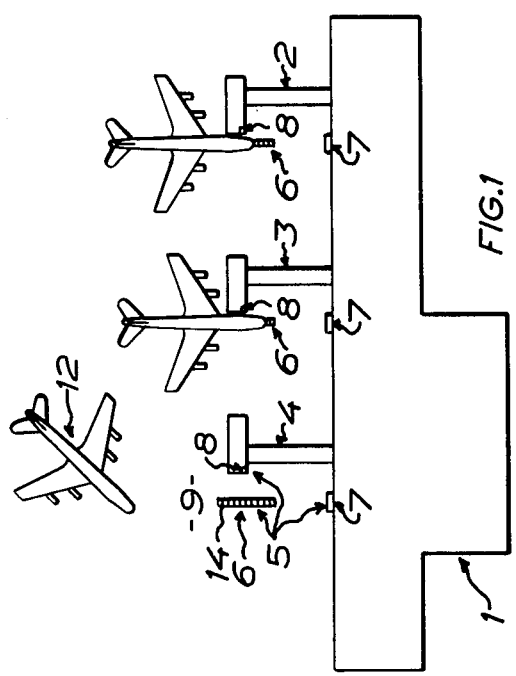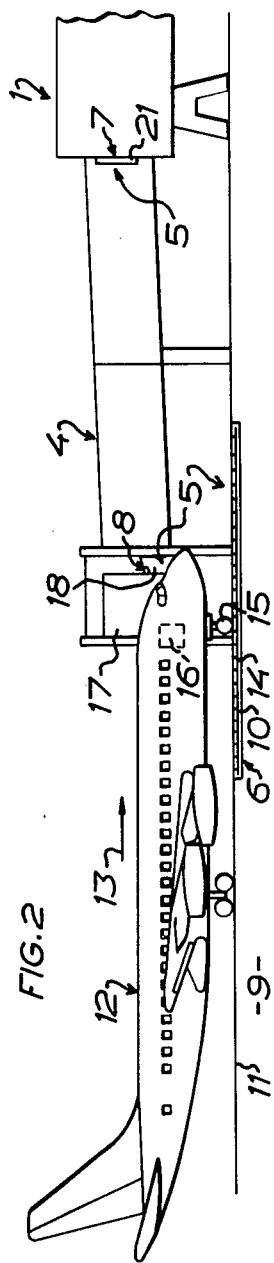

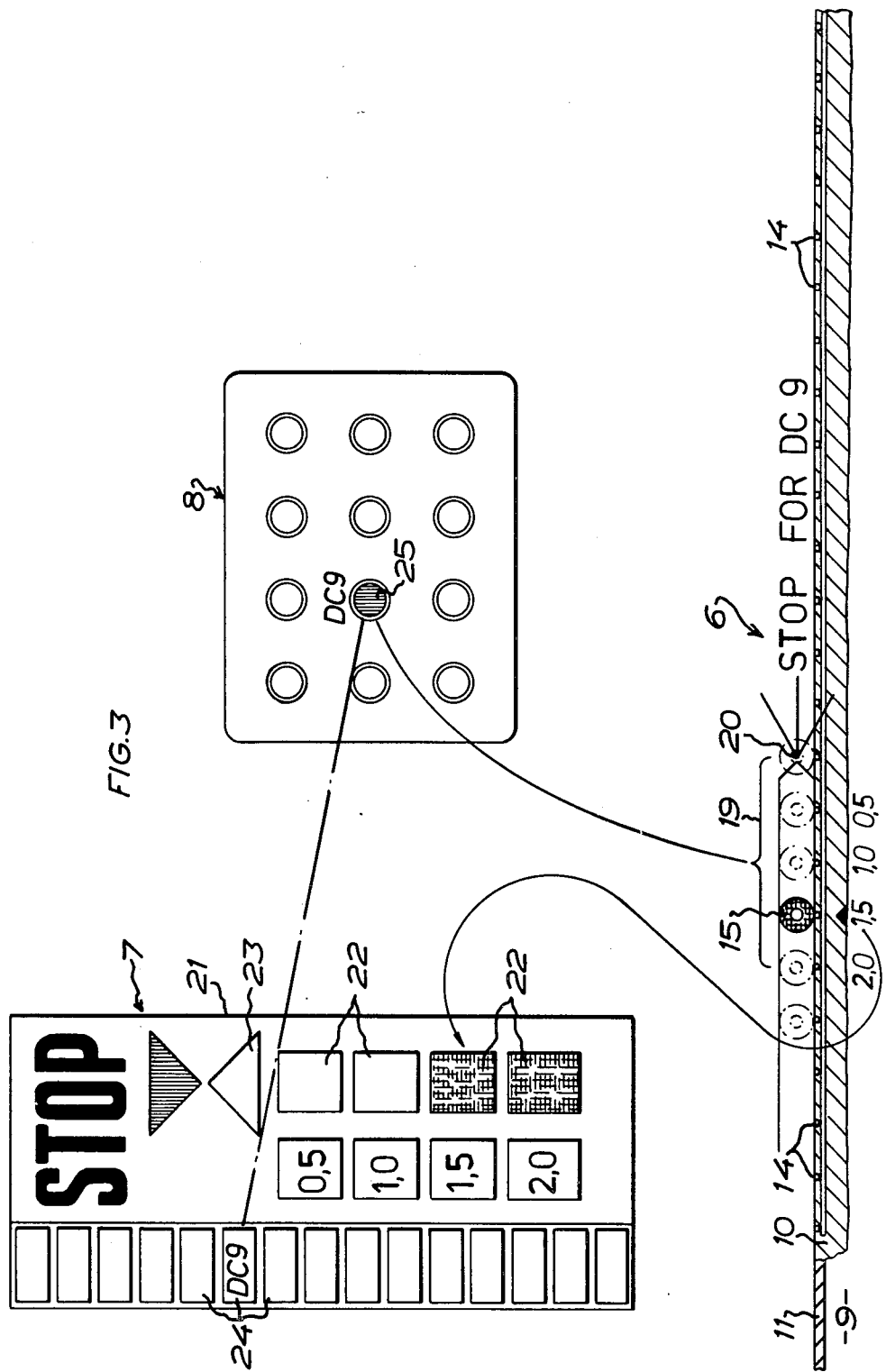

PARKING GUIDANCE SYSTEM FOR AIRCRAFT

This invention relates generally to a parking guidance system for parking of aircraft in airports and more specifically to a system for guiding aircraft pilots in such a way that they are able to stop the aircraft at an exactly predetermined stopping point in a parking place.

Prior art parking guidance systems are based on other technical considerations that is the instant invention. These prior art systems, eleven of which are accounted for in a report entitled "Parking Guidance System (PGS) Study For The International Arrivals Building (AIB) at J. F. Kennedy International Airport" and prepared by Aviation Technical Services, suffer from serious drawbacks, particularly with regard to their capability of covering a great variety of aircraft types, and with regard to their accuracy. In certain cases the pilot has to turn his head in order to discover the stopping signal, and in bad weather, for instance snow and sleet, information signs and other signaling devices may be blocked.

The primary object of the invention is to provide a system of the type indicated, which satisfies all requirements for reliability, flexibility and accuracy and which is specifically adapted to aircraft arriving at civil airports to be stopped exactly at passenger loading devices or at other exactly predetermined stopping points in the airport parking facilities.

Another object of the invention is to design said system in such a way that it is applicable to all aircraft types known at present; the system can also be prepared for future types of aircraft.

These and further objects are attained according to the invention by the fact that the parking guidance system outlined in the foregoing comprises a transmitter unit located in the region of the parking facility, said unit sensing the passage of the aircraft and being connected to an information unit which informs the pilot of the length of the remaining distance up to the stopping point and when said stopping point is reached.

A preferred embodiment of the parking guidance system will be described in greater detail in the following with reference to the accompanying drawings in which FIG. 1 is a schematic plan view of an airport arrivals building equipped with three passenger loading devices, two aircraft being parked at their respective loading devices and a third aircraft rolling in towards its loading device to be parked with the aid of the parking guidance system of the invention associated with said loading device;

FIG. 2 is a schematic side view of the third aircraft at a shorter distance from the loading device, being handled by the system of the invention;

FIG. 3 is a schematic view of the design and function of the system.

In FIGS. 1 and 2 is shown an airport arrivals building 1 equipped with three passenger loading devices 2, 3, 4 of prior art design. A parking guidance system 5 according to the invention is associated with each loading device. The three systems being identical in design and function only the system 5 associated with the loading device 4 shown to the far left in FIG. 1 will be described in greater detail. It should be observed that the number of loading devices and systems of the invention can of course be varied from building to building and that the system of the invention can be utilized without a loading device of the type illustrated.

In the preferred embodiment illustrated the system 5 comprises as main components a transmitter unit 6, an information unit 7 and a push button operating unit 8.

The transmitter unit 6 is formed as a plate 10 fixedly embedded in the ground in the region of parking facilities 9 laterally of the loading device 4. The upper side of said plate is on a level with the upper surface of the surrounding asphalt or concrete apron 11 and can have the dimensions of, say, 10×1 m. A plurality of transmitter elements 14 successively following upon each other in the direction of travel 13 of the aircraft 12 are embedded in the plate 10. The intention is for the nose wheel 15 of the aircraft to pass over said transmitter elements 14 which are formed by elongated contactors, for instance micro tape contactors, extending transversely of and spaced equal distances, say, 0.5 meters apart in the direction of travel 13.

For adaptation of the contactors 14 to the type of aircraft 12 to be parked, i.e. the distance between the nose wheel 15 of the aircraft and its front loading and unloading door 16 so that said door, which in FIG. 2 is shown by broken lines since it is located on the opposite side, will be situated opposite the entrance/exit 17 of the passenger loading device, said contactors 14 can be selectively connected, in groups 19 of five contactors in the case illustrated, by means of the push button unit 8 which is preferably installed in the control panel 18 of the passenger loading device 4. The first four contactors 14 as viewed in the direction of travel 13 of the aircraft 12 inform the pilot via the information unit 7 of the length of the remaining distance, say 2.0, 1.5, 1.0 and 0.5 meters, and the fifth informs the pilot that he shall stop at the stopping point 20. When the nose wheel 15 of the aircraft passes over the first four contactors the pilot can thus decelerate the aircraft 12 in order finally to stop it exactly at the stopping point 20 when the nose wheel actuates the fifth contactor.

Instead of being formed of contactors the transmitter elements 14 can be, say, photoelectric cells or other elements emitting breakable light rays or sound waves.

In the illustrated embodiment the information unit 7 is in the form of an indicator instrument 21 mounted on the terminal building 1 in front of the pilot and having a number of indicator lamps 22 and 23 corresponding to the number of contactors 14 in each group 19; five in the present instance. Said indicator lamps indicate the length of the remaining distance, say, 2.0, 1.5, 1.0 and 0.5 meters, and tell the pilot that he shall stop at the stopping point 20. The indicator lamps 22 for the length of the remaining distance can be of one colour, e.g. orange, and of an ever deeper hue, while the indicator lamp 23 for stop suitably is red. Besides, the indicator instrument 21 preferably includes a number of indicator lamps 24 which indicate the respective type of aircraft so that the pilot knows in advance that the correct group 19 of contactors 14 is connected.

Instead or as a complement of the lamps 22, 23 and 24 the indicator instrument 21 can emit sound signals of different character or have pointers pointing to markings for the length of the remaining distance and for when to stop.

Alternatively, the indicator instrument 21 can be mounted in the aircraft cockpit in front of the pilot, in which case the information from the contactors 14 can be sent to the aircraft by wireless transmission, for instance by radio.

In an alternative embodiment the information unit 7 may be supplemented with or have the form of a sound tape which can be set in motion from the one of the contactors 14 in the connected contactor group 19 over which the aircraft first passes, said sound tape informing the pilot of the length of the remaining distance and telling him when to stop. The sound tape can either be connected to a radio transmitter located for instance in the traffic control tower or elsewhere outside the aircraft and sending the information to the pilot, or be placed in a tape recorder installed in the aircraft.

As already mentioned the push button unit 8 is preferably installed in the control panel 18 of the passenger loading device 4 so that the operator, who at the arrival of the aircraft 12 at the loading device operates it into correct position relative to the aircraft door 16, can press the button 25 corresponding to the type of the arriving aircraft, whereby the indicator lamp 24 for this type is lit on the indicator instrument 21 and the pilot is advised that the correct group 19 of contactors 14 is connected.

What I claim and desire to secure by Letters Patent is:

1. A system for guiding a pilot taxiing an aircraft, having a plurality of wheels, on the ground in such a way that the pilot is enabled to stop the aircraft with satisfactory accuracy at a predetermined stopping point in a parking place, said system comprising a transmitter unit disposed in the region of the parking place and having a plurality of transmitter elements disposed on the surface of the ground successively following each other in a line at spaced locations in the direction of travel of the aircraft as the aircraft approaches the stopping point to cause a selected one of the plurality of wheels to roll successively over the transmitter elements as the aircraft approaches the stopping point; and an information unit operatively connected to the transmitter unit to provide, in response to the passage of said one wheel over successive ones of the transmitter elements toward the stopping point, a continuous quantitative indication of the remaining distance between the one of said spaced locations over which said one wheel is rolling and the stopping point.

2. A system as claimed in claim 1 further comprising means for selectively dividing said transmitter elements into groups and activating a group of the transmitter elements selected in accordance with the type of aircraft to be parked.

3. A system as claimed in claim 2, wherein the means for selectively dividing and activating comprises a push-button unit in the traffic control tower.

4. A system as claimed in claim 2, wherein the means for selectively dividing and activating comprises a push-button unit in a control panel for a passenger loading device at which the aircraft is to be parked.

5. A system as claimed in claim 2, wherein at least the transmitter elements of each group are spaced equal distances apart in the direction of travel of the aircraft.

6. A system as claimed in claim 1, wherein the transmitter elements are formed by elongated contactors directed transversely of the direction of travel of the aircraft.

7. A system as claimed in claim 6, wherein the contactors operate on the pressure wave principle.

8. A system as claimed in claim 6, wherein the contactors operate on the resistance strain principle.

9. A system as claimed in claim 1, wherein the information unit is in the form of an indicator instrument having a number of indicator elements corresponding to the number of transmitter elements in each group, said indicator elements indicating the length of the remaining distance and telling the pilot when to stop.

10. A system as claimed in claim 9, wherein the indicator instrument also has an indicator element which indicates the group of transmitter elements connected and thus the type of aircraft to be guided.

11. A system as claimed in claim 10, wherein the indicator elements emit light signals when activated by the transmitter elements.

12. A system as claimed in claim 11, wherein the indicator instrument is disposed in the aircraft cockpit.

13. A system as claimed in claim 1, wherein the information unit is in the form of a sound tape which can be set in motion from the one of the transmitter elements in the connected group which is first passed and which informs the pilot of the length of the remaining distance and tells him when to stop.

14. A system as claimed in claim 13, wherein the sound tape is connected to a radio transmitter located outside the aircraft and sending the information to the pilot.

15. A system as claimed in claim 13, wherein the sound tape is contained in a tape recorder installed in the aircraft.

16. A system as claimed in claim 10, wherein the indicator elements emit sound signals when activated by the transmitter elements.

17. A system as claimed in claim 10, wherein the indicator elements emit light and sound signals when activated by the transmitter elements.

18. A system as claimed in claim 10, wherein the indicator instrument is disposed on the ground in front of the aircraft when the aircraft is stopped at the predetermined stopping point.

19. A system as claimed in claim 10, wherein the indicator instrument is disposed at an air terminal building in front of the aircraft when the aircraft is stopped at the predetermined stopping place.

* * * * *